(No Model.)
J. EMMNER, Jr.
SECONDARY BATTERY.
No. 451,921.　　　　　　　　Patented May 12, 1891.
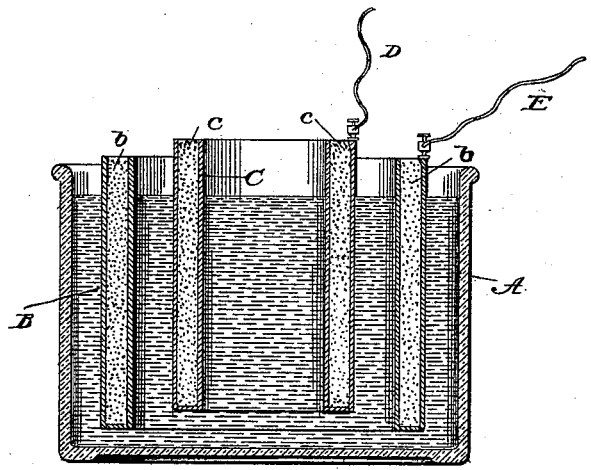

UNITED STATES PATENT OFFICE.

JULIUS EMMNER, JR., OF WASHINGTON, DISTRICT OF COLUMBIA, ASSIGNOR, BY MESNE ASSIGNMENTS, TO PHILIP T. DODGE, TRUSTEE, OF SAME PLACE.

SECONDARY BATTERY.

SPECIFICATION forming part of Letters Patent No. 451,921, dated May 12, 1891.

Application filed July 9, 1889. Serial No. 316,990. (No model.)

*To all whom it may concern:*

Be it known that I, JULIUS EMMNER, Jr., of Washington, in the District of Columbia, have invented certain Improvements in Electric Batteries, of which the following is a specification.

My invention is intended, mainly, as an improvement in what are known as "secondary or storage batteries." Batteries of this class are largely used for motive purposes, lighting purposes, &c., on railway-cars, boats, and other moving structures where lightness and compactness are of prime importance.

It is the aim of my invention to produce a battery which shall be lighter and more compact than those in general use, and which at the same time shall possess great durability, and which may, if desired, be charged by a continuous current in one direction instead of being charged alternately, as in Planté batteries, from negative to positive or positive to negative.

To this end my invention consists, essentially, in constructing either or both of the elements of aluminium as distinguished from other materials, the aluminium element or electrode being coated, filled, or otherwise combined with any suitable active material, and immersed in an electrolytic fluid of any suitable character. By the employment of aluminium I am enabled to provide an element which in proportion to its size and surface is of extreme lightness. As the aluminium is not attacked by the dilute solutions of sulphuric acid or other electrolytic fluids commonly employed, it will remain indefinitely in its original condition. Being free from liability of attack by the acid, it may be made lighter than those of lead or similar materials, which must be made heavier than otherwise necessary, in order that they may possess sufficient strength and rigidity after being reduced or eaten away by the acids. Owing to the fact that they are not attacked by the acid and that there is no local action between them, as in the case of lead elements, I am enabled to make my aluminium elements of various forms, which are not admissible in the case of lead, and to place them in closer proximity than is safely allowable when lead is used. As they undergo no change or destruction, and as the metal possesses great strength and rigidity, the aluminium elements may be made much thinner than those of lead without liability of their buckling or breaking, which are sources of constant trouble in batteries of the ordinary construction.

The aluminium may be prepared in any suitable manner for use in the battery; but I commonly prepare the elements or supports by subjecting them to a current of electricity from any suitable source while they are in a solution of chloride of aluminium and ammonia, then washing and drying them, after which they may receive a charge or coating of active material.

The drawing represents in vertical section a secondary battery on my plan.

A represents a vessel or receptacle of any suitable character adapted to contain the elements and the electrolytic fluid in which they are immersed, the fluid being preferably a weak solution of sulphuric acid.

B and C represent the two elements. Each of these elements is constructed, primarily, of aluminium in the form of an annular cup or trough. In other words, each element consists of inner and outer concentric walls joined to a bottom ring. These rings are filled, as shown at $b$ $c$, with active material, such as chloride of aluminium, lead, tin, or other suitable salts, and are separated or insulated from each other.

The conductors D and E are connected to the respective elements.

The battery is charged by connecting the conductors D E with the opposite poles of any suitable generator and directing a current hence through one of the elements and out through the other. I find that a battery constructed on this plan may be practically charged by passing a current continuously therethrough in one direction.

Having thus described my invention, what I claim is—

1. In a secondary battery, an element composed of aluminium provided with an active material.

2. In a secondary battery, the combination of a vessel, an electrolytic fluid, and two elements, each consisting of a receptacle of aluminium containing active material, such as chloride of aluminium.

3. In a secondary battery, an element consisting of a frame or support of aluminium, combined with chloride of aluminium supported thereby.

In testimony whereof I hereunto set my hand, this 29th day of June, 1889, in the presence of two attesting witnesses.

JULIUS EMMNER, Jr.

Witnesses:
 PHIL. T. DODGE,
 W. R. KENNEDY.